United States Patent
Nishio

(10) Patent No.: US 9,291,131 B2
(45) Date of Patent: Mar. 22, 2016

(54) VEHICULAR AIR INTAKE APPARATUS

(71) Applicant: DENSO CORPORATION, Kariya, Aichi-pref. (JP)

(72) Inventor: Yoshitaka Nishio, Nagoya (JP)

(73) Assignee: DENSO CORPORATION, Kariya (JP)

( * ) Notice: Subject to any disclaimer, the term of this patent is extended or adjusted under 35 U.S.C. 154(b) by 92 days.

(21) Appl. No.: 14/465,964

(22) Filed: Aug. 22, 2014

(65) Prior Publication Data

US 2015/0096520 A1 Apr. 9, 2015

(30) Foreign Application Priority Data

Oct. 4, 2013 (JP) ................................. 2013-208998

(51) Int. Cl.
*F01N 1/06* (2006.01)
*F02M 35/12* (2006.01)
*F02B 29/04* (2006.01)

(52) U.S. Cl.
CPC ........ *F02M 35/1261* (2013.01); *F02B 29/0481* (2013.01)

(58) Field of Classification Search
CPC .................. F02M 35/1261; F02B 29/0481

USPC .............................. 123/184.57; 181/204, 206
See application file for complete search history.

(56) References Cited

U.S. PATENT DOCUMENTS

| | | | |
|---|---|---|---|
| 6,698,390 B1 * | 3/2004 | Kostun et al. ............ | 123/184.57 |
| 6,758,304 B1 * | 7/2004 | McLean ....................... | 181/206 |
| 7,757,808 B1 * | 7/2010 | Vaz et al. ..................... | 181/250 |
| 8,381,871 B1 * | 2/2013 | Hellie et al. ................. | 181/250 |
| 8,727,070 B2 * | 5/2014 | Huber et al. ................. | 181/250 |
| 8,807,274 B2 * | 8/2014 | Muller et al. ................ | 181/254 |
| 2010/0275862 A1 * | 11/2010 | Cassell et al. .............. | 123/41.57 |

FOREIGN PATENT DOCUMENTS

| | | | |
|---|---|---|---|
| JP | 2007-154792 A | 6/2007 | |
| JP | 2007-270619 A | 10/2007 | |

* cited by examiner

*Primary Examiner* — Marguerite McMahon

(57) ABSTRACT

A Helmholtz resonator communicates with an interior of an intake passage, which is configured to draw intake air to a combustion chamber of an engine. The Helmholtz resonator has a volume chamber and a communication pipe. The volume chamber forms a resonance chamber. The communication pipe communicates the volume chamber with the intake passage. The communication pipe includes an acoustic stack, which is configured to cause a temperature gradient by utilizing an acoustic energy.

5 Claims, 4 Drawing Sheets

VEHICULAR AIR INTAKE APPARATUS

CROSS REFERENCE TO RELATED APPLICATION

This application is based on reference Japanese Patent Application No. 2013-208998 filed on Oct. 4, 2013, the disclosure of which is incorporated herein by reference.

TECHNICAL FIELD

The present disclosure relates to a vehicular air intake apparatus configured to draw intake air to a combustion chamber of an engine. More specifically, the present disclosure may relate to a configuration to cool intake air by utilizing a thermal acoustic effect (thermal acoustic phenomenon).

BACKGROUND

A background art will be described with reference to FIGS. 5, 6A, and 6B. As shown in FIG. 5, a thermal acoustic effect is caused by a sound wave. Specifically, a sound wave causes adiabatic compression of air and adiabatic expansion of air to generate acoustic energy, thereby to radiate heat on a compression side and to absorb heat on an expansion side. More specifically, an acoustic stack is employed to utilize a sound wave to cause adiabatic compression of air and adiabatic expansion of air thereby to cause a temperature gradient by utilizing the thermal acoustic effect. The acoustic stack causes difference in temperature at both ends due to heat absorption and heat radiation.

For example, Patent Document 1 discloses a configuration to cool intake air, which flows through the intake passage 101, by utilizing acoustic energy in an intake passage 101. More specifically, the configuration of Patent Document 1 cools intake air by utilizing sound wave energy caused by pulsation in intake air.

It is noted that, the configuration of Patent Document 1 may cause pressure loss in intake air and/or noise.

(Patent Document 1)
Publication of unexamined Japanese patent application No. 2007-270619

SUMMARY

It is an object of the present disclosure to produce a vehicular air intake apparatus configured to cool intake air in an intake passage by utilizing acoustic energy generated in the intake passage, with less pressure loss in intake air.

Patent Document 1 teaches a configuration to equip an acoustic stack in an intermediate portion in the intake passage 101 to cool intake air, which passes through the intake passage 101. It is noted that, the configuration of Patent Document 1 is to cause intake air to pass through the acoustic stack directly. Therefore, the acoustic stack of Patent Document 1 causes a large impedance in intake air. Thus, the acoustic stack of Patent Document 1 causes a large pressure loss in intake air in the intake passage 101.

In the intake passage 101, pulsation in intake air and/or the like may cause air column resonance to result in occurrence of undesirable sound. When air column resonance in a low-pitched sound region occurs in the intake passage 101, the air column resonance may travel as thick sound through an interior of a vehicle, since low-pitched sound is apt to travel easily. Consequently, air column resonance may cause noise in the interior of the vehicle. In consideration of this, as shown in FIG. 6A, a resonator 102 may be equipped in an intermediate portion of the intake passage 101 to reduce air column resonance in the intake passage 101.

The resonator 102 includes a volume chamber 103 and a communication pipe 104. The volume chamber 103 forms a resonance chamber. The communication pipe 104 communicates the volume chamber 103 with the intake passage 101. It is noted that, in the resonator 102, the diameter of the communication pipe 104 is set at a relatively large value in order to draw acoustic energy (sound wave of a noise reduction object), which is generated in the intake passage 101, into the volume chamber 103, and to enhance silencing effect of the resonator 102. In this case, flow of intake air, which passes through the intake passage 101, may be disturbed at a connection (branch portion) between the intake passage 101 and the communication pipe 104. Consequently, pressure loss may arise in intake air inside the intake passage 101.

The resonator 102 is configured to reduce sound by causing resonance. The resonator 102 is configured to reduce noise at a resonant frequency. As shown by the solid line β in FIG. 6B, the resonator 102 has a silencing characteristic, which has a peak around the resonant frequency. It is further noted that, as shown by the solid line γ in FIG. 6B, the resonator 102 may enhance noise, contrary to noise reduction, in frequency regions around the resonant frequency (peak frequency). Therefore, the resonator 102 may increase noise in the frequency regions around the resonant frequency.

According to an aspect of the present disclosure, a vehicular air intake apparatus is for an intake passage, which is configured to draw intake air to a combustion chamber of an engine. The vehicular air intake apparatus comprises a Helmholtz resonator communicating with an interior of the intake passage. The Helmholtz resonator has a volume chamber and a communication pipe. The volume chamber forms a resonance chamber. The communication pipe communicates the volume chamber with the intake passage. The communication pipe includes an acoustic stack, which is configured to cause a temperature gradient with an acoustic energy.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Embodiment

As follows, present disclosure will be described with reference to drawings.

First Embodiment

Figure 1A:
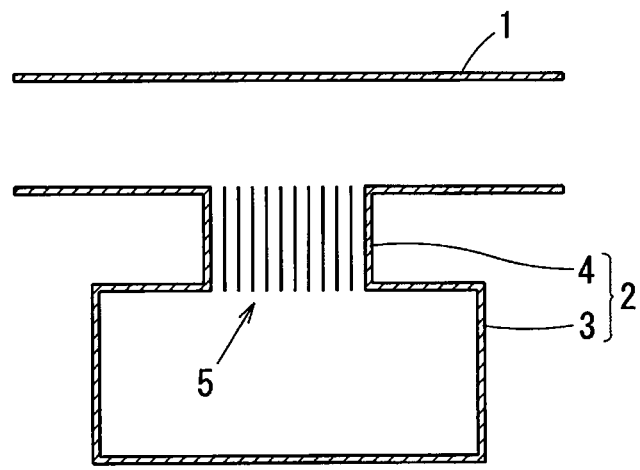
FIG. 1A is a schematic view showing a resonator according to a first embodiment.
Figure 1B:
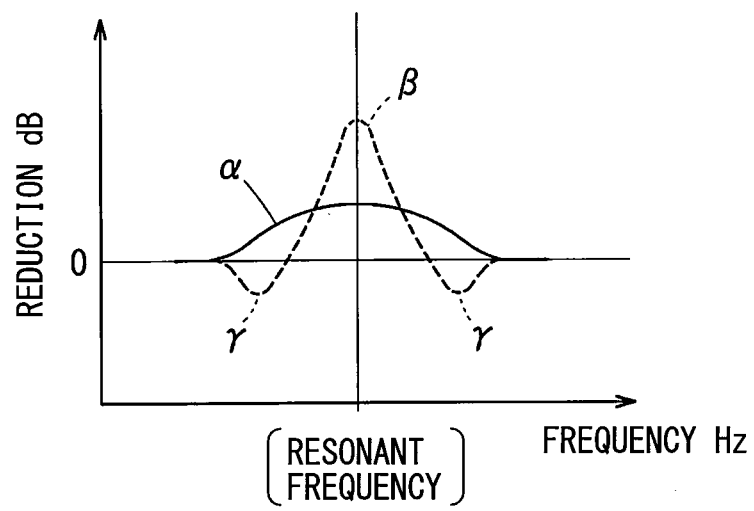
FIG. 1B is a graph showing a silencing effect of the resonator.

A first embodiment of the present disclosure will be described with reference to FIGS. 1A and 1B. A vehicular air intake apparatus includes an intake passage 1, which draws intake air to a combustion chamber of an engine. The intake passage 1 includes an air intake duct, an intake manifold, and an intake port. The air intake duct is equipped with an air cleaner, a throttle valve, and/or the like. The intake manifold distributes air drawn through the air intake duct 1 into cylinders of the engine. The intake port is formed in a cylinder head of the engine.

A Helmholtz resonator 2 is equipped to an intermediate portion of the intake passage 1. The Helmholtz resonator 2 may be equipped at, for example, an intermediate portion of the air intake duct. The Helmholtz resonator 2 is configured to muffle a sound wave at a target frequency. The sound wave may be caused by, of example, air column resonance in a low-pitched sound region caused by, for example, pulsation of intake air. The Helmholtz resonator 2 may be one or may be two or more. In a case where two or more resonators 2 are equipped, target frequencies (silence frequencies) of the resonators 2 may be the same or may be different from each other.

The resonator 2 includes a volume chamber 3 and a communication pipe 4. The volume chamber 3 forms a resonance chamber internally. The communication pipe 4 communicates the interior of the volume chamber 3 with the intake passage 1. In the present example, the volume chamber 3 and the communication pipe 4 may be formed of resin for weight reduction and cost reduction. It is noted that, the material of the volume chamber 3 and the communication pipe 4 is not limited to resin and may be arbitrary selected from various materials.

An acoustic stack 5 is equipped in the communication pipe 4. The acoustic stack 5 is configured to cause a temperature gradient with acoustic energy. The acoustic stack 5 includes multiple small tubes (capillaries). The multiple small tubes communicate the interior of the intake passage 1 with the volume chamber 3. The small tubes may be, for example, in a form of pipes, in a form of a laminated object formed by stacking wire nets, and/or in a form of continued bubbles. The configuration of the small tubes is not limited to the examples and may employ various forms.

The acoustic stack 5 may be formed of, for example, resin similarly to the communication pipe 4. More specifically, for example, the acoustic stack 5 is formed of resin integrally with the communication pipe 4 in order to enhance mountability to another component. The material and/or the mounting configuration of the acoustic stack 5 are not limited to those of the examples. The acoustic stack 5 may be formed of a metallic material and/or a ceramic material and may be affixed to an interior of the communication pipe 4. A material having a high thermal conductivity may be employed as the material of the acoustic stack 5.

First Effect of First Embodiment

As described above, according to the present first embodiment, the acoustic stack 5 is equipped inside the communication pipe 4 of the resonator 2. Intake air drawn through the intake passage 1 toward the engine does not pass through the acoustic stack 5 directly. In this way, the present configuration enables to restrict the acoustic stack 5 from increasing pressure loss in intake air. The acoustic stack 5, which is located in the communication pipe 4, cools intake air with acoustic energy generated in the intake passage 1. The acoustic energy may be sound wave energy caused by pulsation and/or the like. More specifically, the acoustic stack 5 absorbs heat on the side of the intake passage 1 and radiates heat on the side of the volume chamber 3, thereby to cool intake air, which passes through the intake passage 1.

The present configuration according to the present first embodiment employs a simple configuration equipping the acoustic stack 5 in the communication pipe 4 of the resonator 2. Therefore, the present configuration enables to cool intake air, which flows through the intake passage 1, without causing significant pressure loss in intake air. The present configuration enables the acoustic stack 5 to cool intake air by using the acoustic energy, thereby to enhance a filling rate of intake air into the combustion chamber of the engine. Thus, the present configuration enables to enhance engine power and to reduce fuel consumption.

Second Effect of First Embodiment

As described above, the vehicular air intake apparatus according to the first embodiment includes the acoustic stack 5 located in the communication pipe 4 of the resonator 2. The present configuration inhibits intake air from entering into the communication pipe 4 through the opening of the communication pipe 4 on the side of intake air. That is, the communication pipe 4 hardly exerts effect on intake air.

Therefore, intake air, which flows through the intake passage 1, is hardly disrupted at a connection (branch portion) with the communication pipe 4. Thus, the present configuration enables effectively to reduce pressure loss in intake air.

Third Effect of First Embodiment

As described above, the vehicular air intake apparatus according to the first embodiment includes the acoustic stack 5 located in the communication pipe 4 of the resonator 2. The present configuration of the acoustic stack 5 divides the interior of the communication pipe 4 into small passages. Therefore, the interior of the communication pipe 4 is apt to be exerted with influence of viscosity of air. The interior of the communication pipe 4 is apt to be exerted with influence of viscosity of air, thereby to restrict the characteristic of the resonator 2 from being in a shape of an acute peak at the resonant frequency. In addition, as shown by the solid line α in FIG. 1B, silencing effect arises widely in a frequency range around the resonant frequency. Therefore, the present configuration may solve a concern of increase in noise at frequency regions around the resonant frequency, dissimilarly to a conventional configuration.

Second Embodiment

Figure 2:
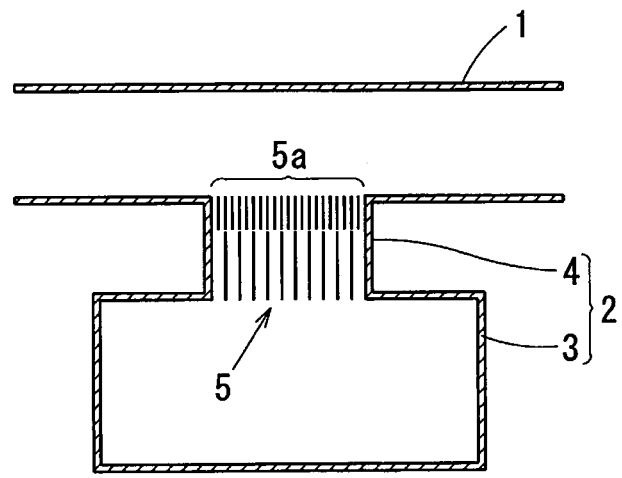
FIG. 2 is a schematic view showing a resonator according to a second embodiment.

A second embodiment of the present disclosure will be described with reference to FIG. 2. According to the present second embodiment, the acoustic stack 5 is formed with multiple small tubes, and the small tubes are small in diameter on the side of the intake passage 1. More specifically, according to the second embodiment, a microscopic tube stack 5a is equipped to the acoustic stack 5 on the side of the intake passage 1. The microscopic pipe stack 5a includes small diameter tubes. That is, according to the present second embodiment, an average aperture ratio of air passage holes (intake-side air passage holes) of the acoustic stack 5 at the end on the side of the intake passage 1 is set smaller than an average aperture ratio of air passage holes (chamber-side air passage holes) of the acoustic stack 5 on the side of the volume chamber 3.

Effect of Second Embodiment

As described above, the microscopic tube stack 5a is equipped in the acoustic stack 5 on the side of the intake passage 1. Thus, the present configuration enables to enhance a heat absorption effect of the acoustic stack 5 on the side of the intake passage 1. Therefore, the present configuration enables further to enhance cooling effect of intake air, which passes through the intake passage 1.

Third Embodiment

Figure 3:
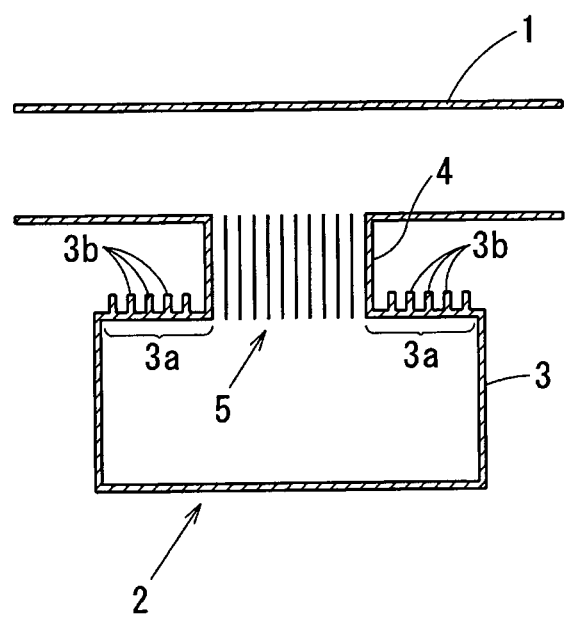
FIG. 3 is a schematic view showing a resonator according to a third embodiment.

A third embodiment of the present disclosure will be described with reference to FIG. 3. According to a third embodiment of the present disclosure, the resonator 2 has radiator fins 3b. The radiator fins 3b are equipped to an outer surface of a vessel member 3a of the volume chamber 3. The vessel member 3a is in contact with the communication pipe 4.

Effect of Third Embodiment

As described above, the acoustic stack 5 radiates heat on the side of the volume chamber 3. The radiator fins 3b equipped on the vessel member 3a of the volume chamber 3, which is in contact with the communication pipe 4. Therefore, the radiator fins 3b enables to increase a quantity of heat dissipation on the side of the volume chamber 3 in the acoustic stack 5, thereby to enhance an thermal acoustic effect. That is, the present configuration enables the acoustic stack 5 further to enhance cooling effect of intake air.

Fourth Embodiment

Figure 4:
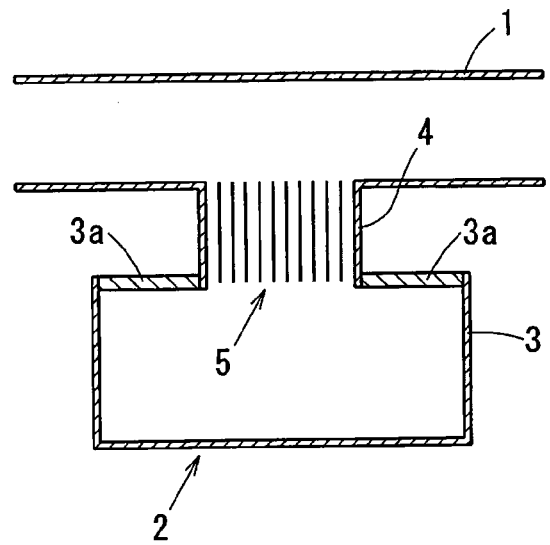
FIG. 4 is a schematic view showing a resonator according to a fourth embodiment.
Figure 5:
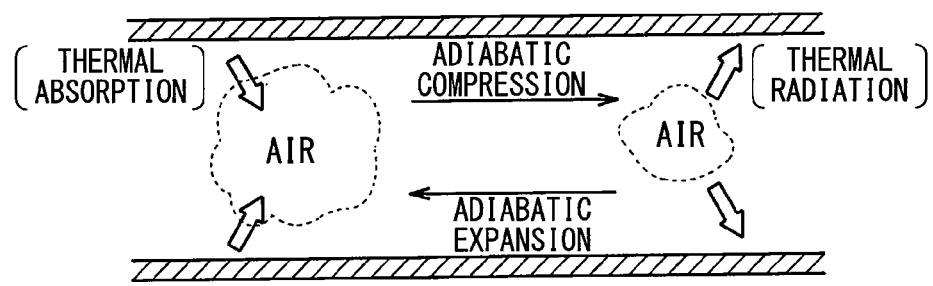
FIG. 5 is an explanatory view showing a thermal acoustic effect.
Figure 6A:
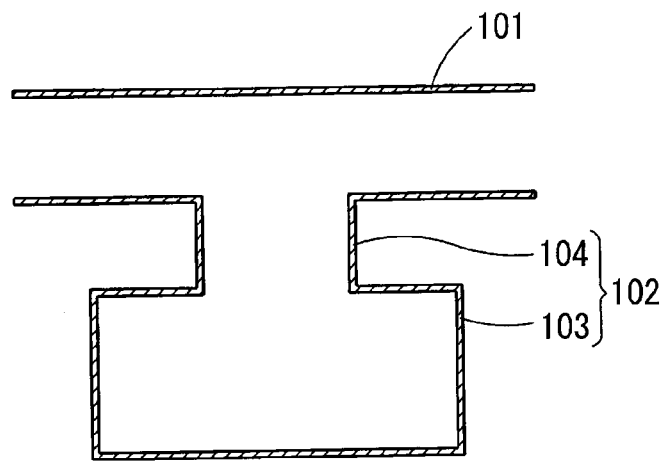
FIG. 6A is a schematic view showing a resonator according to a prior art.
Figure 6B:
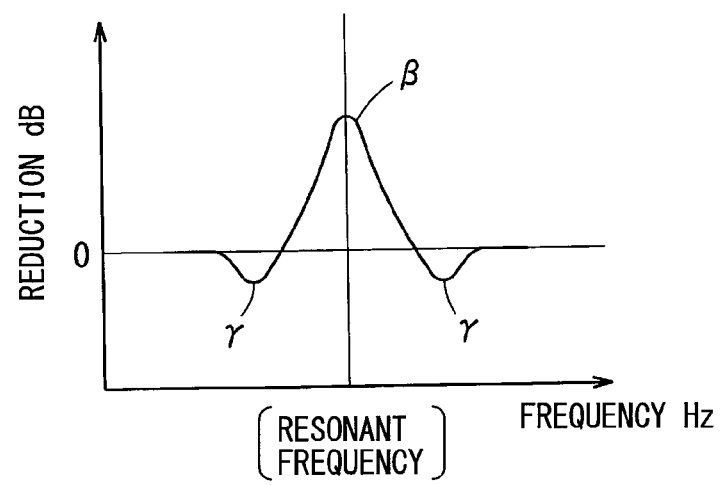
FIG. 6B is a graph showing a silencing effect of the resonator according to the prior art.

A fourth embodiment of the present disclosure will be described with reference to FIG. 4. The resonator 2 according to the present fourth embodiment includes the vessel member (first vessel member) 3a, which is in contact with the communication pipe 4. The vessel member 3a partially defines the volume chamber 3. The resonator 2 according to the present fourth embodiment further includes a second vessel member (other vessel member), which partially defines the volume chamber 3 in addition to the vessel member 3a. The vessel member 3a is formed of a material higher in thermal conductivity than a material of the second vessel member. Specifically, the vessel member 3a, which is in contact with the communication pipe 4, is formed of a material, which has a high thermal conductivity, such as aluminum. The other vessel member (second vessel member), which forms the volume chamber 3, is formed of a material, which has a conductivity relatively lower than the conductivity of aluminum. The other vessel member (second vessel member), which partially forms the volume chamber 3, may be formed of, for example, resin, as exemplified in the first embodiment. The vessel member 3a may be entirely formed of a material having a high thermal conductivity.

Effect of Fourth Embodiment

As described above, the acoustic stack 5 radiates heat on the side of the volume chamber 3. Therefore, the vessel member 3a of the volume chamber 3, which is in contact with the communication pipe 4, is formed of a material having a high thermal conductivity, such as aluminum. Therefore, similarly to the third embodiment, the present configuration enables to enhance a quantity of heat dissipation of the acoustic stack 5 on the side of the volume chamber 3. Thus, the present configuration enables to enhance a thermal acoustic effect. That is, the present configuration enables the acoustic stack 5 further to enhance cooling effect of intake air.

INDUSTRIAL APPLICATION

In the above-described embodiments, the resonator 2, which has the acoustic stack 5, is equipped to the air intake duct. The application of the resonator 2 is not limited to the above-described example. The resonator 2 may be equipped to, for example, the intake passage 1 at an arbitrary intermediate location. The resonator 2 may be equipped at, for example, an air cleaner, a surge tank of an intake manifold, and/or the like.

The drawings of the present disclosure exemplify the configuration in which the acoustic stack is accommodated in the entire region of the communication pipe of the resonator. It is noted that, the configuration of the acoustic stack and the communication pipe is not limited to the above-described example. The acoustic stack may be accommodated in, for example, a part of the communication pipe of the resonator. The configuration of the acoustic stack may be determined arbitrarily.

The above-described disclosure exemplifies the Helmholtz resonator. It is noted that, the acoustic stack may be accommodated in a silencer (quarter wave tube), which is not equipped with the volume chamber. In this case, the mounting position of the acoustic stack may be desirably close to a closed end of the quarter wave tube. It is further noted that, the mounting position of the acoustic stack is not limited to the position close to the closed end and may be determined arbitrarily.

According to the present disclosure, the vehicular air intake apparatus includes an acoustic stack equipped to the communication pipe of the resonator. The acoustic stack is configured to cool intake air by utilizing acoustic energy in the intake passage. The acoustic stack is located in the communication pipe of the resonator. Therefore, dissimilarly to a conventional configuration, intake air, which passes through the intake passage, does not pass through the acoustic stack directly. Therefore, the acoustic stack does no increase pressure loss in intake air, dissimilarly to a conventional configuration. In addition, the acoustic stack is located in the communication pipe to utilize acoustic energy, which is generated in the intake passage, thereby to cool intake air, which passes through the intake passage. Thus, the vehicular air intake apparatus according to the present disclosure employs a simple configuration equipping the acoustic stack in the communication pipe of the resonator. Therefore, the present configuration enables to cool intake air, which flows through the intake passage, without causing significant pressure loss in intake air.

The vehicular air intake apparatus according to the present disclosure includes the acoustic stack located in the communication pipe of the resonator. The present configuration enables to restrict intake air from flowing into the communication pipe through the intake air opening side of the communication pipe. Therefore, the present configuration facilitates intake air to flow through the intake passage with less influence of the communication pipe. Therefore, intake air, which flows through the intake passage, is hardly disrupted at the connection (branch portion) with the communication pipe. Thus, the present configuration enables effectively to reduce pressure loss in intake air.

The vehicular air intake apparatus according to the present disclosure includes the acoustic stack located in the communication pipe of the resonator. The present configuration of the acoustic stack divides the interior of the communication pipe into small passages. Therefore, the interior of the communication pipe is apt to be exerted with influence of viscosity of air. As the interior of the communication pipe is apt to be exerted with influence of viscosity of air, the characteristic of the resonator is restricted from being in an acute peak form around the resonant frequency. Thus, the present configuration causes a silencing effect widely in a frequency range around the resonant frequency. Therefore, the present configuration may reduce a concern of increase in noise at frequency regions around the resonant frequency, dissimilarly to a conventional configuration.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A vehicular air intake apparatus for an intake passage, which is configured to draw intake air to a combustion chamber of an engine, the vehicular air intake apparatus comprising:
   a Helmholtz resonator communicating with an interior of the intake passage, wherein
   the Helmholtz resonator has a volume chamber and a communication pipe,
   the volume chamber forms a resonance chamber,
   the communication pipe communicates the volume chamber with the intake passage, and
   the communication pipe includes an acoustic stack, which is configured to cause a temperature gradient with an acoustic energy.

2. The vehicular air intake apparatus according to claim 1, wherein
   the acoustic stack has intake-side air passage holes at an end on a side of the intake passage,
   the acoustic stack further has chamber-side air passage holes on a side of the volume chamber, and
   an average aperture ratio of the intake-side air passage holes is smaller than an average aperture ratio of the chamber-side air passage holes.

3. The vehicular air intake apparatus according to claim 1, wherein
   the volume chamber is formed with at least a vessel member, which is in contact with the communication pipe, and
   the volume chamber is equipped with a radiator fin.

4. The vehicular air intake apparatus according to claim 1, wherein
   the volume chamber is formed with a first vessel member and a second vessel member,
   the first vessel member is in contact with the communication pipe, and
   the first vessel member is formed of a material, which has a thermal conductivity higher than a thermal conductivity of a material of the second vessel member.

5. The vehicular air intake apparatus according to claim 1, wherein
   the volume chamber is formed with at least a vessel member,
   the communication pipe is formed with at least a pipe member, and
   the vessel member is formed of a material, which has a thermal conductivity higher than a thermal conductivity of a material of the pipe member.

* * * * *